(12) United States Patent
Schwartz

(10) Patent No.: US 6,990,720 B2
(45) Date of Patent: Jan. 31, 2006

(54) WIRE WOUND FLEXIBLE SHAFT HAVING EXTENDED FATIGUE LIFE AND METHOD FOR MANUFACTURING THE SAME

(75) Inventor: Richard J. Schwartz, Bridgewater, NJ (US)

(73) Assignee: S.S. White Technologies Inc., Piscataway, NJ (US)

( * ) Notice: Subject to any disclaimer, the term of this patent is extended or adjusted under 35 U.S.C. 154(b) by 0 days.

(21) Appl. No.: 11/057,471

(22) Filed: Feb. 14, 2005

(65) Prior Publication Data

US 2005/0170896 A1    Aug. 4, 2005

Related U.S. Application Data

(62) Division of application No. 10/288,191, filed on Nov. 5, 2002, now Pat. No. 6,881,150.

(51) Int. Cl.
*B23P 25/00*    (2006.01)
(52) U.S. Cl. .................. 29/458; 29/460; 29/527.4
(58) Field of Classification Search ............... 29/897.2, 29/458, 460, 435, 527.2, 527.4
See application file for complete search history.

(56) References Cited

U.S. PATENT DOCUMENTS

| 571,869 A | 11/1896 | Stow |
| 1,811,697 A | 6/1931 | Reilly |
| 1,905,197 A | 4/1933 | Webb |
| 1,952,301 A | 3/1934 | Webb |
| 2,000,997 A | 5/1935 | Sharpe |
| 2,274,154 A * | 2/1942 | Morgan et al. ............... 464/58 |
| 2,401,100 A | 5/1946 | Pile |
| 2,535,634 A * | 12/1950 | Hubbard ................. 74/502.5 X |
| 3,043,120 A | 7/1962 | Waldron |
| 3,192,795 A | 7/1965 | Pierce |
| 3,242,691 A | 3/1966 | Robinson et al. |
| 3,274,846 A | 9/1966 | Forster |
| 3,584,518 A * | 6/1971 | Hurlow ..................... 74/502.5 |
| 3,705,489 A | 12/1972 | Smollinger |
| 3,791,898 A | 2/1974 | Remi |
| 3,979,896 A | 9/1976 | Klett et al. |
| 4,112,708 A | 9/1978 | Fukuda |
| 4,123,894 A * | 11/1978 | Hughes et al. ................ 57/220 |

(Continued)

FOREIGN PATENT DOCUMENTS

JP    4-92110    * 3/1992

OTHER PUBLICATIONS

McLube Lubrication Technology, printout from www.mclube.com website, Sep. 26, 2002.

*Primary Examiner*—David P. Bryant
(74) *Attorney, Agent, or Firm*—Arthur L. Lessler

(57) ABSTRACT

A wire wound flexible shaft has layers of wire wound one upon another, with a dry film of lubricant bonded to the outer surfaces of a number of the outer layers; or if desired, to the outer surfaces of all layers of the shaft. The lubricant is applied by preheating the partially completed flexible shaft to a temperature substantially above 212° F. but below the decomposition temperature of the lubricant. A liquid medium comprising a carrier and particles of the lubricant is sprayed onto the shaft surface, causing the liquid to vaporize and the lubricant particles to be deposited on the shaft. One or more successive wire layers may then be wound onto the partially completed shaft and the spraying step repeated. Thereafter the shaft is heated to cause the lubricant particles to bond to the adjacent wire layers and to reduce internal stresses in the shaft.

11 Claims, 6 Drawing Sheets

U.S. PATENT DOCUMENTS

| | | | |
|---|---|---|---|
| 4,362,069 A | * 12/1982 | Giatras et al. | 74/502.5 |
| 4,490,969 A | * 1/1985 | Simpson et al. | 57/217 |
| 4,629,707 A | 12/1986 | Wolfe | |
| 4,655,610 A | 4/1987 | Al-Jaroudi | |
| 5,288,270 A | 2/1994 | Ishikawa | |
| 5,300,366 A | * 4/1994 | Nakamaru et al. | 428/549 |
| 5,636,551 A | * 6/1997 | Davidson et al. | 74/502.5 |
| 6,526,645 B2 | * 3/2003 | Romano | 29/435 |

* cited by examiner

Step 1
Advance A Partially Completed Flexible Shaft Having At Least One Wire Layer Wound on Another Layer Or A Core Wire, Through An Induction Heater to Heat The Shaft to a Temperature Substantially Above 212°F But Below The Temperature That Would Cause Explosive Evaporation Of The Lubricant Carrier

Step 2
Advance the Heated Partially Completed Flexible Shaft Through A Chamber While Spraying The Shaft With A Liquid Carrier Containing A Lubricant, So That The Carrier Is Vaporized Upon Contact With The Shaft And The Lubricant Is Deposited On The Shaft Surface

Step 3
Wind Another Wire Layer On The Partially Completed Shaft

Step 4
Repeat Steps 1 to 3 Until Lubricant Has Been Deposited On The Outer Layer Of The Flexible Shaft

Step 5
Heat Treat The Flexible Shaft At A Temperature Below The Decomposition Temperature Of The Lubricant To Reduce Internal Stresses In The Flexible Shaft And Cure The Lubricant

Figure 1

WIRE WOUND FLEXIBLE SHAFT HAVING EXTENDED FATIGUE LIFE AND METHOD FOR MANUFACTURING THE SAME

This application is a divisional of prior application Ser. No. 10/288,191, filed Nov. 5, 2002, now U.S. Pat. No. 6,881,150.

BACKGROUND OF THE INVENTION

This invention relates to a wire wound flexible shaft having an extended fatigue life, and a method for manufacturing the same.

Wire wound flexible shafts usually comprise a central or mandrel wire, upon which is wound successive helical wire layers, each layer normally being wound with a pitch direction opposite to that of the preceding layer. The shaft has a predetermined length dependent upon the desired use thereof. A flexible shaft assembly is made by providing a length of flexible shaft with fittings at the shaft ends which facilitate connection of one of the ends to a driving or shaft turning member such as a handle, crank or motor, and connection of the other end to a driven member such as a valve or a rotatable tool.

Such flexible shaft assemblies typically are used where the driving and driven members are not coaxial, so that while transmitting torque from the driving to the driven member the shaft must bend to accommodate the non-aligned positions of said members.

Unidirectional flexible shafts are intended for rotation and torque transmission in only one angular direction, while bidirectional shafts, the need for which arises less frequently, are intended to rotate and transmit torque in both angular directions.

In the large scale manufacture of such flexible shafts, a continuous section of shaft material is wound using winding machinery adapted for that purpose; and after the shaft material is wound, it is cut into the desired lengths, which are then provided with end fittings to complete the flexible shaft assembly.

When a flexible shaft transmits torque, the wire layers of the shaft rub against each other, and the resulting friction heats the shaft. Under some rotation conditions the wires of a flexible shaft can become red hot. This friction and heat cause the wires of the shaft to fatigue; and the shaft eventually breaks.

Attempts to increase the fatigue life of wire wound flexible shafts have focused primarily on providing more durable wire for making the shafts, and heat treatment to reduce internal stresses within the shaft. Attempts to reduce internal friction by use of lubricants have had limited success.

U.S. Pat. No. 5,288,270 to Ishikawa entitled Flexible Shaft Having Element Wire Groups And Lubricant Therebetween discloses a structure wherein grease is introduced into interstices of a wire wound flexible shaft in order to reduce friction. The lubrication approach taken by Ishikawa, however, has a number of drawbacks.

According to the teaching of Ishikawa the flexible shaft is made by winding a layer of hemp yarns around a central or core wire (also known as a mandrel wire). Successive layers of steel wire are then wound around the hemp layer. Thereafter the flexible shaft so formed is cut to a desired length and lubricated by vacuum impregnation with grease, in the course of which the grease penetrates into and is absorbed by the hemp yarn to form a grease-bearing layer. The grease also penetrates into interstices of the wires. The grease-bearing layer acts as a reservoir to slowly release grease into the flexible shaft interstices.

At low temperatures the grease in the flexible shaft of Ishikawa becomes more viscous, resulting in stiffening of the shaft accompanied by a decrease in flexibility and an increase in the torque required to start rotation of a driven member attached to the shaft assembly. The grease will break down in high temperature environments or in situations where a combination of environment temperature and residual internal friction sufficiently increases the temperature of the shaft wires. The grease tends to be axially pumped along the shaft as it rotates; and if the shaft is turned unidirectionally, as the majority of flexible shaft assemblies are, the grease would be pumped in one direction only and would accumulate at one end of the shaft while providing little or no lubrication at the other end. Cutting and handling of the grease impregnated shaft of Ishikawa would be extremely difficult, so that to manufacture the Ishikawa flexible shaft, the shaft material must be cut to desired lengths prior to impregnation, making the Ishikawa structure unsuitable for large scale manufacture.

The currently used method of lubrication is to apply grease to the outer wire layer of the flexible shaft. This method lubricates only the outer layer and does not reduced friction between the various wire layers of the shaft, as the lubricant does not reach the inner layers. High pressure lubrication of the outer layer has also been employed, with only limited improvement over the conventional outer layer lubrication method.

While each wire used to wind the flexible shaft is individually lubricated during spooling (i.e. when the wire is wound unto a spool for use in a winding machine), the lubricant burns off when the wound shaft is heat treated (typically at a temperature in the range of 800 to 900° F.) to reduce internal stresses.

Accordingly, an object of the present invention is to provide a wire wound flexible shaft having extended fatigue life, and a method for manufacturing the same.

SUMMARY OF THE INVENTION

The present invention provides a wire wound flexible shaft having a first wire layer with an outer surface and a second wire layer wound around the outer surface of the first layer. A dry film of a lubricant is bonded to the outer surface of the first layer, thus reducing friction between the layers when the shaft is rotated.

The present invention also provides a process for manufacturing a wire wound flexible shaft by a process in which one or more layers of wire are wound upon a core wire to form a partially completed flexible shaft. Particles of a lubricant are sprayed onto the flexible shaft, so that the particles are deposited on the exposed surface of the shaft. Thereafter the flexible shaft is heated to cause the lubricant particles to bond thereto.

THE DRAWINGS

FIG. 1 is a flow chart showing a wire wound flexible shaft lubrication method according to a preferred embodiment of the invention.

DETAILED DESCRIPTION

Process Description

Figure 2:
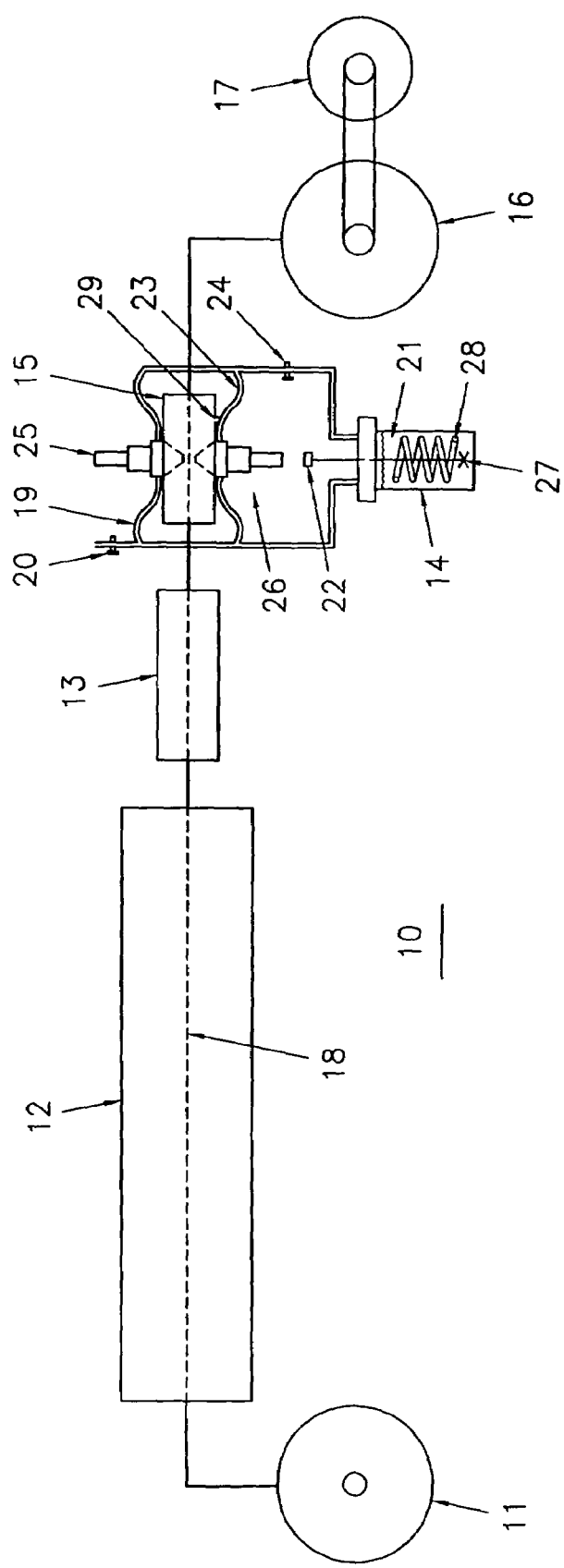
FIG. 2 is a diagram showing equipment used in practicing the method of FIG. 1.

As seen in FIG. 1, the preferred embodiment of the process of the present invention has five major steps. These steps involve the application of a dry lubricant to the exposed surface of the outer wire layer of a partially wound flexible shaft, followed by the winding of an additional wire layer on the shaft and application of a dry lubricant to the outer surface of that additional layer. This process is repeated until the lubricant has been applied to each of the desired layers. One or more additional non-lubricated layers may optionally be subsequently wound atop the lubricated layers, although this is not preferred.

After completion of the winding and lubricant application steps, the flexible shaft ends up bent, i.e. curved or biased as a result of the winding operations to which it has been subjected. In a conventional manner, the flexible shaft goes through a bending operation which works the shaft so as to, greatly reduce or eliminate this curvature or bias.

Then the shaft is heat treated to reduce internal stresses which would otherwise reduce the useful life of the shaft. Such a heat treatment process is conventional. However, in the process of the preferred embodiment of the present invention, the heat treatment process also serves the purpose of causing the lubricant particles to be cured so that they bond to the adjacent wires of the shaft. The lubricant particles also extend into interstices between the wires of adjacent layers.

The lubricant particles are made of material which will not decompose at the elevated temperatures (typically in the 800° F. to 900° F. range) at which the shaft is to be heat treated. The preferred lubricant for this purpose is a composition which comprises molybdenum disulfide and graphite, with a particle size in the sub micron range. A suitable material is sold by Tiodize Company, Inc. with offices at 5858 Engineer Drive, Huntington Beach, Calif. 92649, under the trade name Tiolube 29, in accordance with U.S. government specification MIL-L-81329.

The lubricant particles are entrained or suspended in a suitable liquid carrier, preferably water, to provide a lubricant medium for facilitating application of the particles. The lubricant medium is stored in a reservoir which is continually stirred to maintain an even distribution of the particles in the liquid.

At Step 1 of FIG. 1, a partially completed flexible shaft consisting of a central (also known as a core or mandrel) wire or group of wires with at least one wire layer wound on it is coaxially advanced through an induction heater to preheat the shaft. The wire material may be steel, inconel, phosphorous bronze, monel, or any metal that can be drawn into wire. The preheat temperature is substantially above the boiling point of the carrier; i.e. sufficiently high to vaporize the carrier upon contact with the preheated shaft but not so high as to cause (i) explosive evaporation of the carrier or (ii) decomposition of the lubricant material. In the preferred embodiment the carrier is water and the preheat temperature is approximately 350° F.

At Step 2 the preheated partially completed flexible shaft is advanced through a spraying chamber. In that chamber the lubricant medium is sprayed onto the preheated shaft, causing the carrier to be vaporized almost immediately, i.e., the carrier "flashes off" the shaft, so that the lubricant particles are deposited on the shaft. If desired the reservoir can be heated so as to speed up the evaporation process since the carrier will already be at an elevated temperature when it contacts the shaft.

Thus at the end of Step 2 the shaft is coated with lubricant particles. However, the particles are not yet bonded to the exposed wire layer of the shaft. To accomplish such bonding the shaft must be heated to a higher temperature sufficient to cause fusing of the particles to the shaft, which results in formation of a molecular bond rendering the particles (which fuse into an adherent film) strongly affixed to the adjacent wire layer.

At Step 3 another wire layer is wound on the partially completed shaft, overlapping the particles deposited on the previously exposed layer. At Step 4 the processes of preheating the shaft and spraying it with the lubricant medium to deposit lubricant particles on the exposed wire layer are repeated; and if desired these processes are repeated to provide successive lubricated wire layers, the number of layers depending on the design of the flexible shaft involved.

Wire wound flexible shafts are frequently contained within a cylindrical casing so that the shaft rotates inside the casing. Depending on the material of the inner surface of the casing and the particular application involved, it may or may not be desirable to deposit the lubricant particles on the outermost surface of the shaft.

After the outermost layer has been wound on the shaft and the final deposition of lubricant particles has occurred, at Step 5 the shaft is heat treated at a temperature which is typically in the 800° F. to 900° F. range, to relieve stresses within the shaft and at the same time cure the lubricant particles so that a dry lubricant film is formed which is bonded to the adjacent wire of the shaft. Since the aforementioned preferred lubricant has a decomposition temperature above 1100° F. it is not adversely affected by the heat treatment/curing temperature.

Thereafter the shaft is worked to reduce or eliminate its curvature or bias, and cut into the desired lengths. The resulting shafts are then either sold in that form, or provided with end fittings and sold as flexible shaft assemblies with or without casings.

Equipment Description

A winding and lubricating equipment unit 10 which is preferred for carrying out the aforementioned process is shown in FIG. 2. The major portions of the unit are a flexible shaft supply reel 11, a shaft winding machine 12, a preheating induction heater 13, a pressurized lubricant medium reservoir 14, a lubricant spray chamber 15, and a flexible shaft takeup reel 16 which is rotated by a takeup motor 17.

The supply reel 11 may contain a core or mandrel wire (or a core or mandrel wire group in the form of a cable comprising wire strands twisted together) alone, or a partially completed flexible shaft 18 in the form of one or more layers of wire wound on a core or mandrel. The takeup reel 16 is rotated by the reel motor 17 to pull the mandrel or partially completed shaft 18 so that it advances successively through the shaft winding machine 12, preheating induction heater 13, and spraying chamber 15. The mandrel or wire is guided by various guide rollers disposed along its path (not shown). In the preferred embodiment the linear speed of the mandrel or partially completed flexible shaft 18 is about 9 feet per minute.

The shaft winding machine 12, which is of conventional construction, helically winds a wire layer upon the mandrel or partially completed flexible shaft 18 emerging from the supply reel 11. The layer is wound in the opposite helical direction to the then existing outer layer (if any) of the partially completed flexible shaft. Automatic, semiautomatic and manual shaft winding machines are known in the art, and any of such machines may be used in practicing the method of the present invention.

After a wire layer is wound on the mandrel or partially completed flexible shaft 18 by the winding machine 12, the partially completed flexible shaft passes through the preheating induction heater 13 where radio frequency energy induces eddy currents in the shaft which heat it to a temperature of about 350° F. This temperature is sufficiently high to immediately vaporize water in lubricant medium sprayed on the wire, while not being so high as to cause explosive evaporation of the water. By the term "explosive evaporation" is meant evaporation at such a high rate that when lubricant medium is sprayed onto the wire, the resulting water vapor expands with sufficient force to significantly disrupt the water spray or remove significant amounts of deposited lubricant from the wire.

After emerging from the preheating induction heater 13, the partially completed shaft traverses the spraying chamber. 15. Pressurized air (at 25 p.s.i.g. in the preferred embodiment) enters the reservoir 14 via conduit 19 and air inlet flow control valve 20 to pressurize the air above the surface of the lubricant medium 21 in the reservoir 14. A mixing motor 22 rotates a mixing blade 27 disposed within the reservoir 14 to maintain a homogeneous mixture of the water and lubricant particles comprising the lubricant medium 21.

Lubricant medium 21 is directed into the spray chamber 15 by conduit 23 and spray control valve 24. The conduit 23 communicates with the pressurized tank 14 and the spray nozzles 25 and 26, which are positioned on opposite sides of the partially completed flexible shaft 18. If desired, more than two nozzles may be employed, in which event they should preferably be symmetrically positioned about the partially completed flexible shaft 18. If desired, the reservoir may be heated by a heating coil 28.

Driven by the pressurized air above it, the lubricant medium 21 travels through the conduit 23, spray control valve 24 and spray nozzles 25 and 26 to impinge upon the partially completed flexible shaft 18. Upon contacting the hot shaft wire, the water in the lubricant medium immediately evaporates, depositing the entrained or suspended lubricant particles on the exposed wire surface.

Excess material comprising lubricant medium, condensed water and free lubricant particles falls to the funnel-shaped bottom of the spray chamber 15, from which this material flows through a drain 29 into a catch basin. The excess material is recycled by means not shown and reintroduced to the reservoir 14.

The partially completed shaft 18 emerges from the spray chamber 15 with an essentially dry coating of lubricant particles deposited on the exposed surface of the shaft. However, this coating is either uncured or only partially cured and thus is not yet securely adherent to the adjacent wire surface of the shaft.

If another layer of wire is to be wound on the partially completed flexible shaft 18 to meet the requirements of a particular flexible shaft design, the takeup reel 16 (which now contains the partially completed flexible shaft with its outer wire layer covered with a coating of lubricant particles or, if partially cured, a film comprising the deposited lubricant material as well as lubricant particles) is removed and the supply reel 11 is replaced by the takeup reel 16. The takeup reel is replaced by a fresh takeup reel which is rotated to advance the lubricant coated partially completed flexible shaft through the equipment unit 10, to wind another wire layer on the shaft and provide a lubricant coating thereon.

After the desired number of wire layers have been wound on the partially completed flexible shaft and provided with lubricant coatings (provision of a lubricant coating on the outermost layer as well as one or more of the innermost layers being optional), the resulting takeup reel containing the partially completed flexible shaft is removed from the equipment unit 10 and transported to a heat treating/curing station 30.

Figure 5:
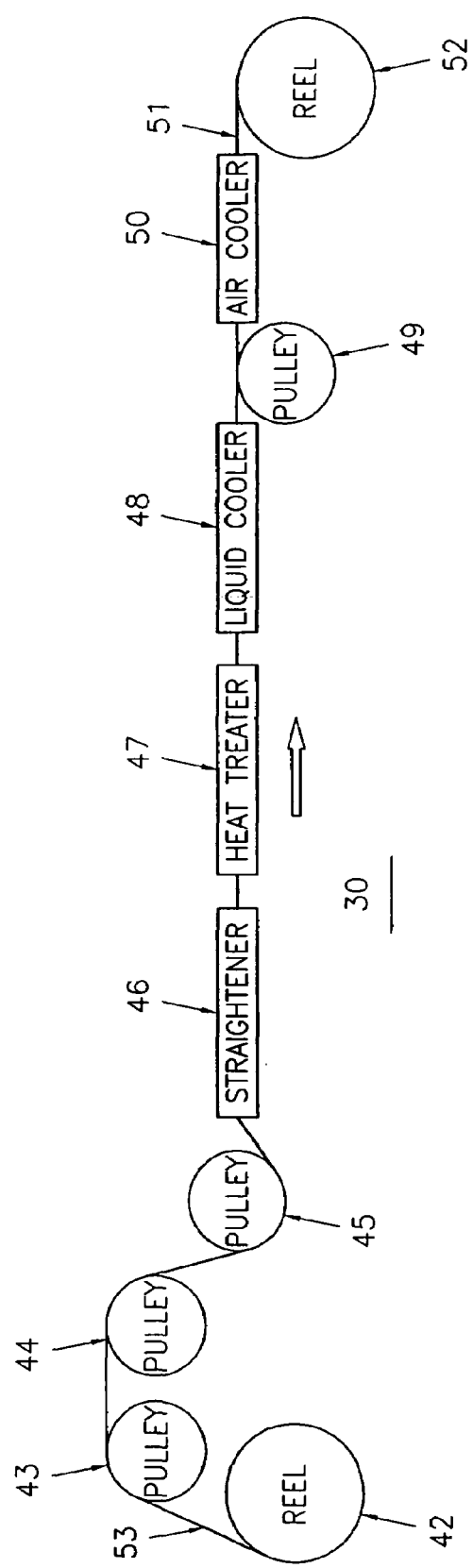
FIG. 5 is a diagram showing equipment used in carrying out Step 5 of the method of FIG. 1.

At the heat treating/curing station 30, shown in FIG. 5, the partially completed flexible shaft having one or more wire layers coated with dry lubricant is subjected to a heat treating cycle in accordance with conventional parameters, as follows.

The finished shaft 53 passes over the guide pulleys 43, 44 and 45, through the straightening heads 46, through the induction heat treater 47 at a temperature of 800° F. to 900° F., through the (optional) liquid cooling tube 48, around guide pulley 49, and through an air cooling tube 50. The cured flexible shaft 51 leaving the air cooling tube 50 is collected on the takeup reel 52. This heat treating process is typically performed at a linear shaft speed of about 25 feet per minute and can be carried out as the corresponding shaft is being wound, or as a batch process after winding of the shaft has been completed.

The heat treatment reduces stresses in the shaft while also curing the lubricant, resulting in one or more lubricant films securely bonded to the adjacent wire surfaces of the flexible shaft.

After the flexible shaft has been heat treated and the lubricant therein has been cured, the reel containing the shaft is transported to a conventional bending/working station 31 which bends and works the shaft so as to reduce or eliminate the curvature of the shaft which results from the winding operations. Thereafter the shaft is cut into desired lengths. If the desired product to be shipped is to be shaft assemblies, the cut lengths of shaft are provided with shaped ends or end fittings adapted to engage driving and driven members of tools, equipment or machinery with which the shafts are intended to function.

Figure 3:
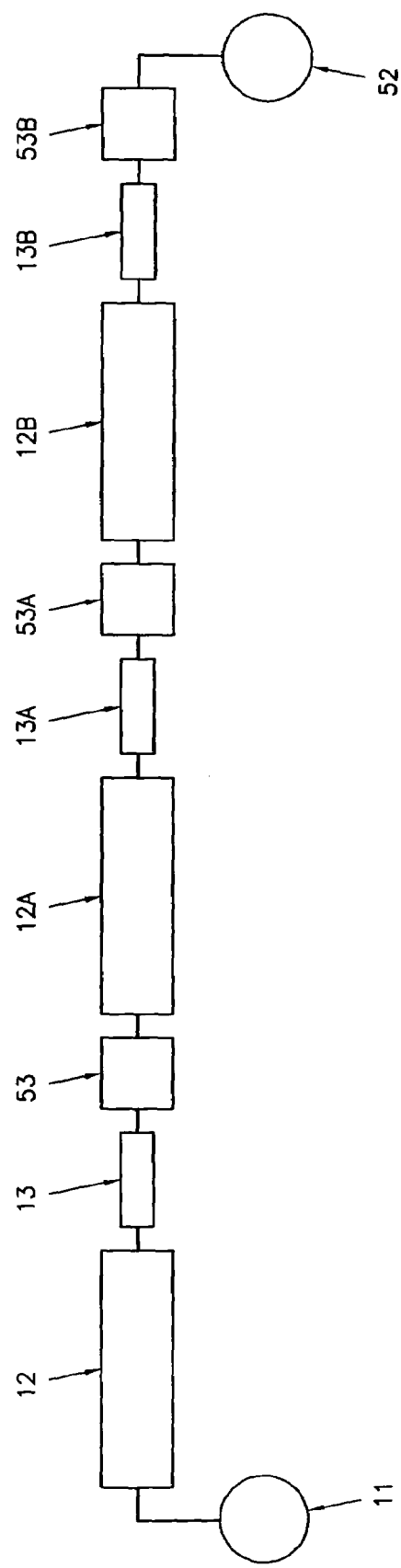
FIG. 3 is a diagram showing equipment which may alternatively be used in practicing the method of FIG. 1.

FIG. 3 shows a linear array of winding and lubricating equipment units 10, in which the lubricated partially completed shaft emerging from each unit is advanced to the next unit downstream for winding and lubrication of an additional wire layer. With the arrangement of FIG. 3 production of the shaft is more efficient, since it is not necessary to move supply and takeup reels each time another layer of wire is to be wound on the partially completed flexible shaft, or to change winding machine settings for each layer to be wound. Once the partially completed flexible shaft has had the desired number of wire layers wound and lubricated, it is subjected to the aforementioned heat treatment/curing and bending/working operations at stations 30 and 31 respectively.

Resulting Flexible Shaft Configuration

Figure 4:
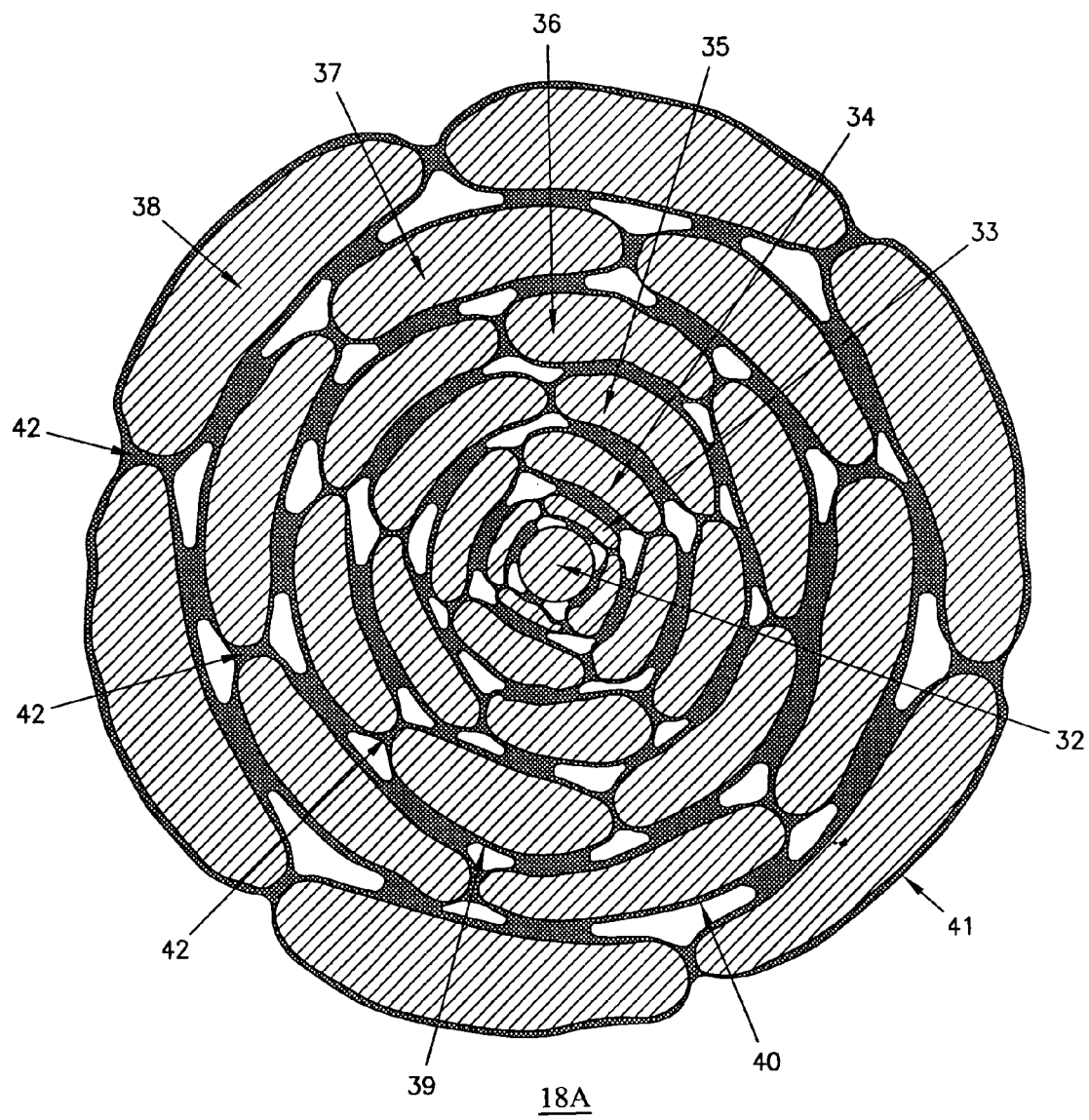
FIG. 4 is a cross-sectional view of a wire wound flexible shaft manufactured by the method of FIG. 1 using the equipment of FIG. 2.
Figure 4A:
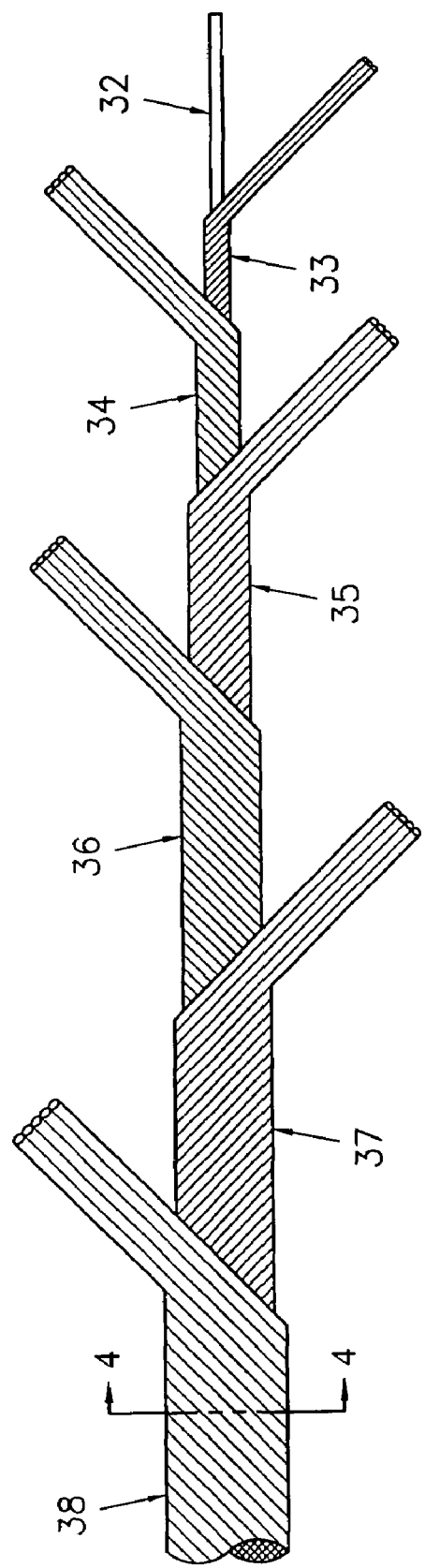
FIG. 4a is a partially unwound isometric view of the wires of the wire wound flexible shaft shown in FIG. 4.

FIG. 4 shows a cross-sectional view of a flexible shaft 18A manufactured according to a preferred embodiment of the invention; while FIG. 4a shows the wires of said flexible shaft with the shaft partially unwound for clarity of visualization. This particular shaft has a central core wire 32 upon which six wire layers 33 through 38 have been successively helically wound, each layer being wound in a helical direction opposite to that of the underlying layer. In this shaft the outer three layers 36, 37 and 38 are coated with dry lubricant films 39, 40 and 41. The film 39 is bonded to the adjacent wires of layers 36 and 37; the film 40 is bonded to the adjacent wires of layers 37 and 38; and the film 41 is bonded to the outer surfaces of the wire comprising layer 38. Due to the fact that some particle softening and flow occurs during the curing process, these films also extend into interstices 42 between the layers 36–37 and 37–38.

Process Example

Two versions of a six layered wire wound flexible shaft were made as described below. One version ("non-lubricated flexible shaft") was made without application of any lubricant. The other version ("lubricated flexible shaft") was made by applying a dry lubricant to the exposed surfaces of the outermost three wire layers, since these layers typically carry 70% to 80% of the torsion load on the shaft.

A spraying fixture was made with a hollow cylindrical plastic pipe, with two lubricant medium spray nozzles mounted on the pipe. One of the nozzles was mounted at the top of the pipe and the other was mounted at the bottom of the pipe. Two end covers were made with an axial hole through each of them, so that the shafts could pass through the pipe via the axial holes, and sprayed material would be contained within the pipe.

A drain hole was made at the bottom of the pipe. The nozzle was one customarily used with a 25 p.s.i.g. pressure. A pressurized tank was used to provide this pressure. The tank contained lubricant (comprising molybdenum disulfide and graphite) as previously described, mixed with water as a carrier.

All six layers of the non-lubricated flexible shaft were wound on an electronic shaft winding machine.

The first four layers of the lubricated flexible shaft were wound on the same electronic shaft winding machine, which machine was equipped with an induction heater. The partially competed flexible shaft was preheated in the induction heater to a temperature in the range of 300° F. to 350° F., after which the shaft passed through the aforementioned plastic pipe where it was sprayed with the lubricant particle containing water from the pressurized tank. The contact of the spray with the shaft flash evaporated the water and deposited an adherent dry film of the lubricant on the shaft, but did not cure the lubricant film.

This flash evaporation technique was used to prevent the water carrier from causing the lubricant particles to drip off the shaft during subsequent processing. Alternatively, other techniques for applying the lubricant particles to the shaft might be used, such as passing the preheated shaft through a pressurized chamber containing a "cloud" of lubricant particles. However, no such alternative application method was tested.

In this example a temperature higher than the 350° F. range was avoided in order to eliminate the risk that a higher temperature might cause explosive evaporation of the water carrier and blow away the lubricant to be deposited.

The spraying fixture was mounted on the electronic shaft winding machine right after the induction heater. Only one spraying fixture was made and the last three (fourth fifth, and sixth) layers of each lubricated flexible shaft were lubricated individually. Air and liquid pipes were plugged into the nozzle outlets. The pressurized tank was filled with lubricant.

Once the fourth layer was lubricated by the spraying fixture on the electronic shaft winding machine, a fifth wire layer was wound on the fourth layer, on an automatic shaft winding machine. The partially completed flexible shaft having the fifth layer was placed on a reel of the electronic shaft winding machine; and was preheated and lubricated in the same manner as the fourth layer. Similarly, once the fifth layer was lubricated by the spraying fixture on the electronic shaft winding machine, a sixth wire layer was wound on the fifth layer, on an automatic shaft winding machine. The partially completed flexible shaft having the sixth layer was placed on a reel of the electronic shaft winding machine; and was preheated and lubricated in the same manner as the fifth layer.

The electronic shaft winding machine was run at 9 feet per minute. The induction heater preheat temperature to 350° F. and an air pressure of 25 p.s.i.g. was applied to the air pipe connected to the nozzle inlets. Thus the partially completed preheated flexible shaft passed through the spraying fixture, where the lubricant particles, entrained or suspended in water, were sprayed onto the shaft under 25 p.s.i.g. pressure.

As a result, a uniform coating of the lubricant was deposited on the exposed wire surface of the partially completed flexible shaft. The coating thickness was not measured. However, there was no shaft wire visible through the lubricant coating.

Two hundred feet of shaft was lubricated by the aforementioned procedure. The fourth, fifth and sixth layers were all wound on the automatic shaft winding machine, and were all lubricated on the electronic shaft winding machine under the same conditions as stated above.

Two hundred feet of non-lubricated flexible shaft was wound on the electronic shaft winding machine, with the same parameters (wire material, wire size, number of layers, etc.) as the lubricated flexible shaft.

The lubricated flexible shaft was then put through the normal heat treatment schedule. The non-lubricated flexible shaft was subjected to the same heat treatment schedule.

The heat treatment not only reduced stresses in the lubricated flexible shaft, but also cured the dry lubricant film at a temperature below the lubricant decomposition temperature of about 1100° F. Curing of the lubricant film is essential, since If the film is not cured it would not adhere to the shaft wire on a molecular level, and would be worn off the shaft in a relatively short time. If the heat treatment/curing temperature were to be much above 1100° F., the lubricant film would be burned away.

Ten 3.5 inch length samples were formed (i.e. bent and worked to reduce bending or curvature) and cut from a reel containing the heat treated/cured lubricated flexible shaft. Similarly, ten 3.5 inch length samples were formed (i.e. bent and worked to reduce bending or curvature) and cut from a reel containing the heat treated non-lubricated flexible shaft.

These twenty samples were subjected to repetitive 25 pound-inch torque cycles until each shaft sample broke, in order to determine their fatigue life. The numbers of cycles required to break each sample are shown in Table 1 below.

TABLE 1

| Non-Lubricated Flexible Shafts Fatigue Cycles | Lubricated Flexible Shafts Fatigue Cycles |
| --- | --- |
| 1807 | 3309 |
| 1975 | 4608 |
| 1747 | 4248 |

TABLE 1-continued

| Non-Lubricated Flexible Shafts Fatigue Cycles | Lubricated Flexible Shafts Fatigue Cycles |
|---|---|
| 1900 | 3825 |
| 1903 | 3684 |
| 1705 | 3680 |
| 2150 | 3139 |
| 1908 | 4265 |
| 2051 | 4531 |
| 2079 | 4893 |

Table 1 shows that the flexible shafts lubricated in the manner described above exhibited a fatigue life approximately twice that of otherwise identical non-lubricated shafts.

While only the outermost three wire layers were lubricated in the aforementioned example, lubrication of additional layers would be expected to result in a further improvement in fatigue life.

I claim:

1. A process for manufacturing a wire wound flexible shaft, comprising the steps of:
    winding at least one layer of wire upon a core wire to form a partially completed flexible shaft;
    preheating said partially completed flexible shaft;
    spraying the preheated partially completed flexible shaft with a liquid carrier containing a lubricant, so that the carrier is vaporized upon contact with the shaft and the lubricant Is deposited on the exposed surface of the shaft;
    subsequently winding another wire layer on the partially completed shaft having the lubricant deposited thereon;
    repeating said heating, spraying and subsequent winding steps one or more times; and
    heating said wires having lubricant deposited thereon at a temperature sufficient to cause the deposited lubricant to bond to the wires.

2. The process according to claim 1, wherein said lubricant comprises molybdenum disulfide.

3. The process according to claim 1, wherein said lubricant has a predetermined decomposition temperature and, said wires having lubricant deposited thereon are heated at a temperature below said decomposition temperature.

4. The process according to claim 3, wherein during said preheating step said partially completed flexible shaft is heated to a temperature substantially above 212° F. and below both the decomposition temperature of said lubricant and the temperature that would cause explosive evaporation of the carrier.

5. The process according to claim 1, 3, 2 or 4, wherein said lubricant comprises particles entrained or suspended in said carrier.

6. A process for manufacturing a wire wound flexible shaft, comprising the steps of:
    winding at least one layer of wire upon a core wire to form a partially completed flexible shaft;
    spraying particles of a lubricant onto the partially completed flexible shaft, so that the particles are deposited on the exposed surface of the shaft;
    subsequently winding another wire layer on the partially completed shaft having the lubricant particles deposited thereon; and
    repeating said spraying and subsequent winding steps one or more times.

7. The process according to claim 6, comprising the additional step of, after said repeating step, heating the flexible shaft to cause the lubricant particles to bond thereto and to reduce internal stresses in the shaft.

8. A process for manufacturing a wire wound flexible shaft, comprising the steps of:
    winding one or more layers of wire upon a core wire to form a partially completed flexible shaft;
    spraying particles of a lubricant onto the flexible shaft, so that the particles are deposited on the exposed surface of the shaft; and
    heating the flexible shaft to cause the lubricant particles to bond thereto,
    whereby said lubricant reduces internal stresses in the shaft.

9. A process for manufacturing a wire wound flexible shaft, comprising the steps of:
    providing a lubricant medium comprising a liquid carrier having lubricant particles entrained or suspended therein;
    advancing a partially completed flexible shaft having at least one wire layer wound on another layer or a core wire, through a heater to preheat the shaft to a temperature substantially above 212° F. but below a temperature that would cause explosive evaporation of the lubricant carrier;
    advancing the preheated partially completed flexible shaft through a chamber while spraying the shaft with said lubricant medium, so that the carrier is vaporized upon contact with the shaft and the lubricant particles are deposited on the shaft surface;
    subsequently winding another wire layer on the partially completed shaft having the lubricant particles deposited thereon;
    repeating said preheating, spraying and subsequent winding steps one or more times; and
    heating said wires having lubricant particles deposited thereon at a temperature sufficient to cause the particles to bond to the wires.

10. The process according to claim 9, wherein said last mentioned heating step comprises heat treating the flexible shaft to reduce internal stresses therein.

11. A process for manufacturing a wire wound flexible shaft, comprising the steps of:
    winding one or more layers of wire upon a core wire to form a partially completed flexible shaft;
    applying particles of a lubricant onto the flexible shaft, so that the particles are deposited on the exposed surface of the shaft; and
    treating the flexible shaft to cause the lubricant particles to bond thereto.

* * * * *